(12) United States Patent
Angerer et al.

(10) Patent No.: US 7,026,737 B2
(45) Date of Patent: Apr. 11, 2006

(54) ROTOR FOR AN ELECTRIC MACHINE, ESPECIALLY A SYNCHRONOUS MACHINE, AND SYNCHRONOUS MACHINE WITH A TRANSVERSE FLUX

(75) Inventors: Wolfram Angerer, Heidenheim (DE); Andreas Lange, Zang (DE); Uwe Muhlberger, Heidenheim (DE)

(73) Assignee: Voith Turbo GmbH & Co. KG, (DE)

( * ) Notice: Subject to any disclaimer, the term of this patent is extended or adjusted under 35 U.S.C. 154(b) by 0 days.

(21) Appl. No.: 10/415,252

(22) PCT Filed: Oct. 18, 2001

(86) PCT No.: PCT/EP01/12040

§ 371 (c)(1),
(2), (4) Date: Jul. 8, 2003

(87) PCT Pub. No.: WO02/35682

PCT Pub. Date: May 2, 2002

(65) Prior Publication Data

US 2004/0061398 A1   Apr. 1, 2004

(30) Foreign Application Priority Data

Oct. 27, 2000   (DE)   ................................ 100 53 589

(51) Int. Cl.
*H02K 1/28* (2006.01)

(52) U.S. Cl. ............ 310/156.02; 310/153; 310/156.08; 310/156.12; 310/156.48; 310/261; 310/67 R; 310/75 R

(58) Field of Classification Search ........... 310/156.08, 310/156.12, 156.18, 156.26, 156.36, 156.37, 310/156.48, 156.49, 156.51, 156.55, 156.59, 310/156.61, 74, 261, 264, 266, 267, 156.02, 310/156.25
See application file for complete search history.

(56) References Cited

U.S. PATENT DOCUMENTS

| 2,485,474 | A | * | 10/1949 | Brainard | ................. 310/156.51 |
| 2,754,440 | A | * | 7/1956 | Brainard | ................. 310/156.51 |
| 3,596,122 | A | * | 7/1971 | Stewart | .................... 310/67 R |
| 4,668,116 | A | * | 5/1987 | Ito | ............................ 403/258 |
| 5,111,094 | A | * | 5/1992 | Patel et al. | ............ 310/156.22 |

(Continued)

FOREIGN PATENT DOCUMENTS

DE   3536538   4/1987

(Continued)

*Primary Examiner*—Burton Mullins
(74) *Attorney, Agent, or Firm*—Ostrolenk, Faber, Gerb & Soffen, LLP

(57) ABSTRACT

The invention relates to a rotor for an electric machine, especially a synchronous machine with transverse flux, especially a synchronous generator, especially a TFM rotor. The invention is characterized by the following features: a support element; a pole structure which is located on a first end face in the area of the outer periphery of the support element and which comprises two rows of magnet arrangements, these magnet arrangements being magnetized alternately in the peripheral direction, and collectors or soft iron elements being located between the magnet arrangements and being separated by an intermediate layer of electrically and magnetically nonconductive material; on the second end face pointing away from the first end face, the support element has at least one partial area which forms a flange surface for applying to a connecting element and in which means are provided for guiding means for creating a rotationally fixed connection or partial elements of means for creating a rotationally fixed connection are located.

25 Claims, 5 Drawing Sheets

U.S. PATENT DOCUMENTS

| | | | |
|---|---|---|---|
| 5,753,987 A * | 5/1998 | Shepherd et al. | 310/75 R |
| 5,783,893 A * | 7/1998 | Dade et al. | 310/266 |
| 5,796,195 A * | 8/1998 | Miyakawa | 310/68 B |
| 5,889,348 A * | 3/1999 | Muhlberger et al. | 310/218 |
| 5,942,828 A | 8/1999 | Hill | 310/164 |
| 5,952,746 A * | 9/1999 | Mittmann et al. | 310/42 |
| 6,097,124 A * | 8/2000 | Rao et al. | 310/156.26 |
| 6,365,999 B1 * | 4/2002 | Muhlberger et al. | 310/254 |

FOREIGN PATENT DOCUMENTS

| | | | |
|---|---|---|---|
| DE | 3705089 | | 8/1988 |
| DE | 3904516 | * | 6/1990 |
| DE | 4125779 | | 12/1992 |
| DE | 4400614 A1 | * | 6/1994 |
| DE | 29813023 | | 11/1999 |
| EP | 779695 | * | 6/1997 |
| EP | 0898353 | | 2/1999 |
| EP | 0942517 | | 9/1999 |

\* cited by examiner

ROTOR FOR AN ELECTRIC MACHINE, ESPECIALLY A SYNCHRONOUS MACHINE, AND SYNCHRONOUS MACHINE WITH A TRANSVERSE FLUX

BACKGROUND OF THE INVENTION

The invention relates to a rotor for an electric machine, in particular a synchronous machine with transverse flux, in particular a synchronous generator having the features from the preamble of claim 1; in addition, a synchronous machine with a rotor, in particular a synchronous generator with transverse flux and a drive unit having a synchronous machine in the form of a synchronous generator with transverse flux.

It is generally known to integrate generators for providing electrical energy in drive systems. For reasons connected with minimizing the overall space, bearing-free generators are incorporated which, in the known designs, dispense with a bearing on the drive side, but still require a mounting on the output side of the generator. In this case, how the generators are constructed is unimportant. Also conceivable in this case are designs of generators which operate with transverse flux. These are also referred to as synchronous generators with traverse flux, in particular TFM generators. In this case, however, it is necessary to provide a generator shaft to attach the rotor to a primary energy producer. In particular in a conventional area of use, the arrangement of a generator on a flywheel for the purpose of converting the mechanical energy into electrical energy, the connection between the rotor of the generator, in particular to a TFM generator and the drive machine, is characterized by rotationally elastic behavior. In order to avoid the damaging effects of the associated oscillations on the actually converted electrical power and the service life of the generator, a spring-damper arrangement with simultaneous compensation of angular errors is normally used. A significant disadvantage of this design consists, however, in the fact that this is very long in terms of axial length, that is to say in particular when incorporated in a drive train, does not operate without wear and is very complicated with regard to the constructional design. With regard to the designs of TFM machines which can also be operated as generators, reference can be made to the documents cited below:

(1) DE 35 36 538 A1
(2) DE 37 05 089 C1
(3) DE 39 04 516 C1
(4) DE 41 25 779 C1

These documents describe in essence the basic principle and the construction of electric machines which operate on the transverse flux principle, it being possible for these to be operated both as motors and as generators.

SUMMARY OF THE INVENTION

The invention was therefore based on the object of developing a design of a synchronous machine with transverse flux, in particular a synchronous generator for the purpose of converting mechanical energy into electrical energy, in such a way which, with regard to the required overall space, is as small as possible in the axial direction and whose attachment to a primary energy producer, of no matter which type, is characterized by virtually wear-free transmission of power and necessitates little constructional expenditure.

According to the invention, for this purpose, the rotor of the electric machine, in particular synchronous machine with transverse flux, in particular for use as a synchronous generator, is constructed in such a way that it comprises a support element, on whose one end face, in the area of the outer periphery, a pole structure comprising two rows of magnet arrangements magnetized alternately in the peripheral direction with collector elements or soft iron elements located in between, which are separated by an intermediate layer of electrically and magnetically nonconductive material, is arranged. On the second end face, pointing away from the first end face, the support element is free of a pole structure and has a partial area which forms a flange surface for application to a connecting element, for example a primary generator or an element coupled to the latter, and in which means for guiding means for implementing a rotationally fixed and torsionally rigid connection to a connecting element or part elements of means for implementing a rotationally fixed and torsionally rigid connection to the connecting element are arranged. This means that the rotor is not assigned its own mounting and the latter is supported by the bearing arrangement of the connecting element. The connecting element in this case cannot move in the axial and radial direction, because of its mounting.

The rotor is used in a synchronous machine, in particular a synchronous generator, which comprises a stator structural unit and at least one armature winding which is associated with the pole structure. In this case, the stator structural unit is supported on the casing of the synchronous machine, in particular the synchronous generator. The synchronous generator with transverse flux which is thus produced, and which is also called a transverse flux machine generator, is single-phase and therefore does not have its own mounting or its own shaft. The inventors have discovered that for applications for converting energy from mechanical energy into electrical energy in drive trains, for example on flywheels, the operating behavior of the synchronous machine used there, in particular the synchronous generator, is unimportant, so that the latter can be of single-phase design. This single-phase design is characterized by the configuration of the rotor according to claim 1 and of the synchronous machine according to claim 11. In the overall drive system, the rotor of the synchronous generator is connected directly to the flywheel of a drive machine or another primary energy producer. As a result, a torsionally rigid connection to the primary energy producer is achieved. An additional spring-damper system to avoid oscillations is not required. Using the solution according to the invention, therefore, in addition to a simple constructional design, a structural unit with a low axial length is implemented.

With respect to the practical configuration of the synchronous machine and in particular also to the rotor of the synchronous machine, there are a large number of possibilities.

Also with respect of the construction of the pole structure, in particular the implementation of the connection between the individual elements and the support element, there are a large number of possibilities, which are suitable for different strength requirements. In the simplest case, the coupling between pole structure and support element is merely made in a cohesive manner, for example by being potted by means of a potting compound. An additional increase in strength can be implemented by means of form-fitting and/or force-fitting connections. In the simplest case, clamping elements are used for this purpose, which clamp the pole structure to the support element in the axial direction. In this case, clamping bolts or simple clamping screws are used as clamping elements. In addition, measures can be provided for fixing the individual rows of magnet arrangements magnetized alternately in the peripheral direction with collector or soft iron elements lying in between them and the intermediate layer and the end ring and/or the support element in the radial direction, normally being based on a form fit. This also applies in an analogous way to the coupling of the magnet arrangements and collector or soft iron elements adjacent to one another in the peripheral direction in the individual rows, possible ways for axial and/or radial securing also being provided here, which are likewise generally based on a form fit in addition to the cohesive fit.

The choice of the practical measures to increase the strength of the rotor structure is substantially dependent on the loading to be expected, in particular the rotational speeds. Since these are determined by the practical use, the configuration of the rotor depends on this and lies within the competence of the responsible person skilled in the art.

The means for implementing a rotationally fixed connection between the rotor, in particular the support element of the synchronous machine with transverse flux, in particular the synchronous generator, and a connecting element are used to implement a rotationally fixed connection based on a force-fit and/or a form fit. To this end, as its end face facing away from the pole structure, in the partial area forming the flange surface, the rotor either has passage openings which are used to hold and guide fixing means, for example screws, or passage openings with threads, which are simultaneously used for the screw fixing. The passage openings are in this case preferably arranged at a specific distance from one another in the peripheral direction on a common diameter. An arrangement on different diameters is likewise conceivable. Another possibility is to provide, on the end face facing away from the pole structure, protrusions or recesses, which enter into an operative connection with complementary recesses or protrusions on the connecting element. In this case, however, means for the axial fixing of the position of rotor and connecting element in relation to each other are additionally required, which, for example, can be implemented by means of fixing elements corresponding to the procedure first proposed.

The synchronous machine with transverse flux configured according to the invention, in particular the synchronous generator, comprises, in addition to a rotor having the features as already described, a stator structural unit and a casing. In this case, the stator structural unit is supported on the casing. As a result of the possibility of directly attaching the rotor to a connecting element and mounting the stator structural unit in the casing of the synchronous machine, it is possible to dispense with a mounting for the rotor. The synchronous machine is thus free of a rotor shaft and a mounting.

The casing of the synchronous machine, in particular the synchronous generator, can be designed in one part or in several parts. The multipart design will preferably be chosen for assembly reasons. In the case of the multipart design, a first casing part is provided which forms a lateral limit for the synchronous machine and which is connected to a further, second casing part element, which extends in the axial direction beyond the axial extent of the pole structure as far as into the area of the support element. The second casing part thus encloses the pole structure in the peripheral direction and, with the first casing part element, forms what is known as a casing bell. In this case, an outer stator of the stator structural unit can be fixed to the second casing part element. If the stator structural unit additionally comprises an inner stator, the latter is arranged on a further, third casing part element, which is connected to the first casing part element and extends into the pole structure. The arrangement of the inner stator is in this case preferably made directly on the third casing part element.

For protection against contamination, the second casing part element is preferably designed in such a way that it extends as far as into the area of the support element and, between the support element, in particular the outer periphery of the support element, and the inner periphery of the second casing part element, a non-contact seal can be provided.

The configuration according to the invention of the synchronous machine, in particular the synchronous generator, in the event of integration in a drive unit, requires the fitting of the casing to the synchronous machine, in particular the synchronous generator with transverse flux, to another stationary element, preferably likewise a casing element. The attachment is preferably made directly to the casing of the connecting element.

A preferred area of application of a synchronous generator configured in accordance with the invention with transverse flux is the conversion of energy from mechanical energy into electrical energy in drive systems of motor vehicles. In this case, the attachment is made to a flywheel coupled to a drive engine. However, there is generally the possibility of arranging the synchronous generator configured in accordance with the invention on any kind of energy-producing equipment.

BRIEF DESCRIPTION OF THE DRAWINGS

The solution according to the invention will be explained below using figures, in which the following are illustrated in detail.

DESCRIPTION OF PREFERRED EMBODIMENTS

Figure 1A:
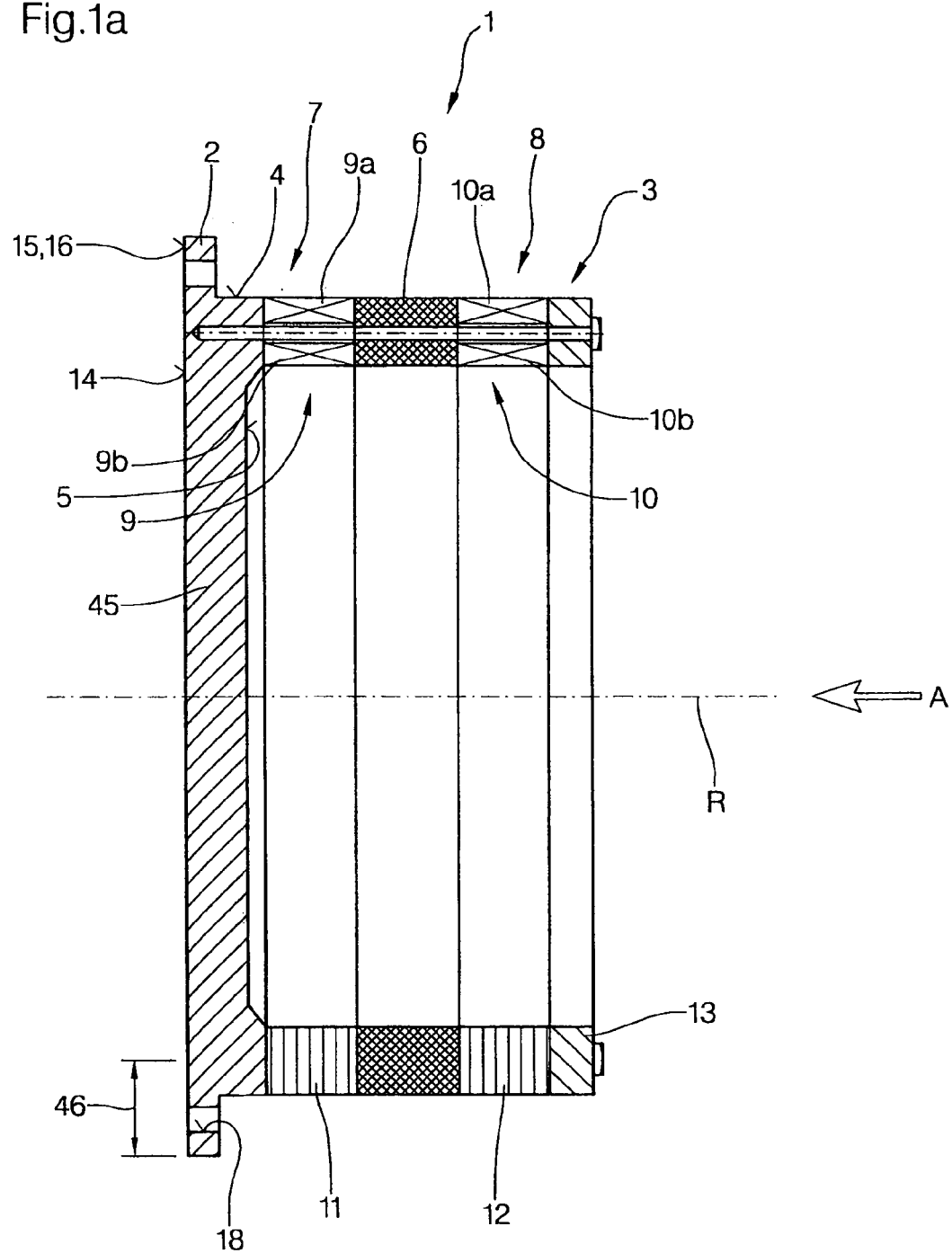
FIGS. 1a, 1b illustrate, in a schematically simplified illustration, an exemplary embodiment of a rotor configured in accordance with the invention for a synchronous generator with transverse flux, in two views.
Figure 1B:
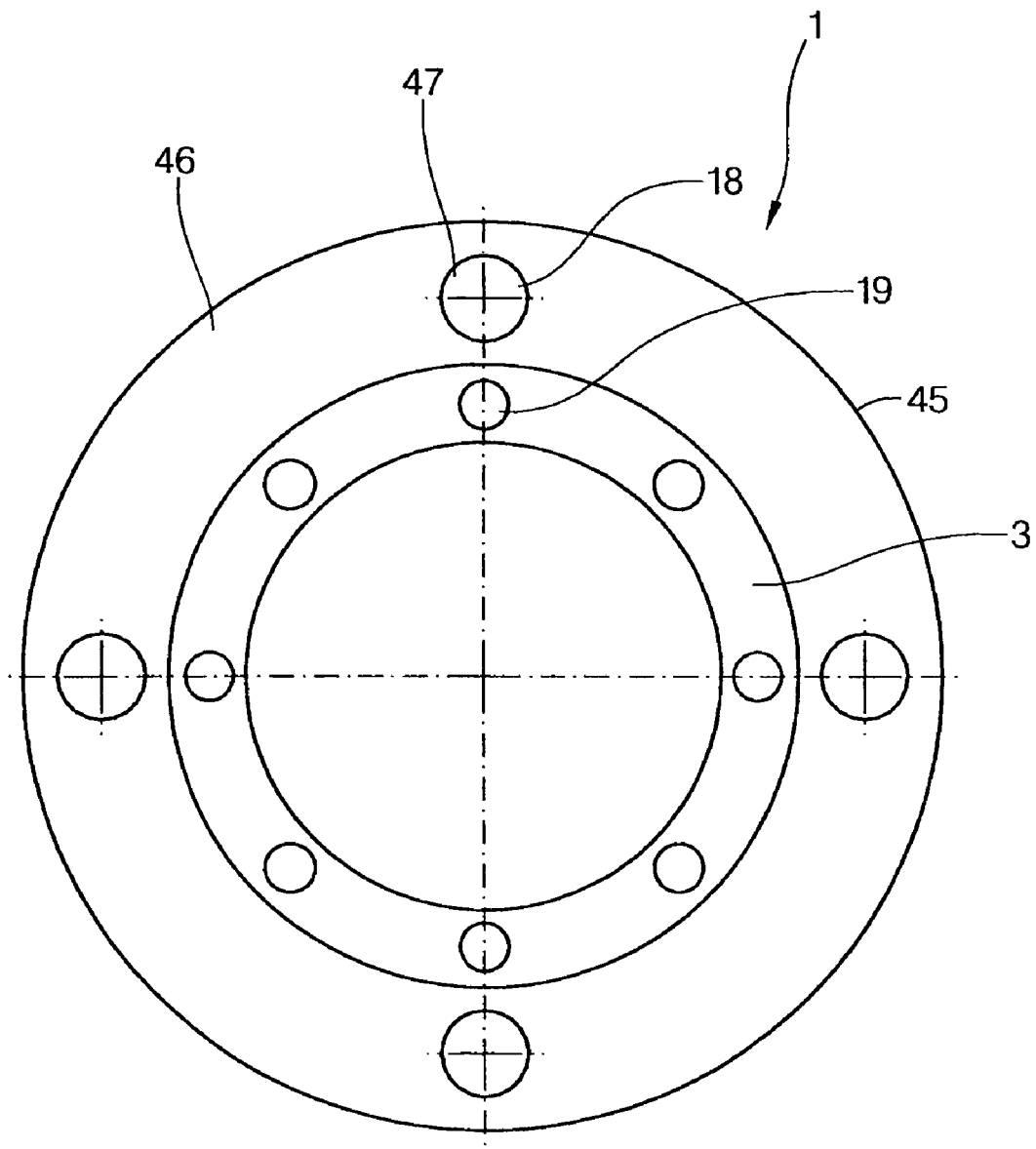

FIGS. 1a and 1b illustrate, in a schematically simplified illustration, an exemplary embodiment of a rotor 1 configured in accordance with the invention for an electric machine, in particular a synchronous machine with transverse flux, which is preferably used as a synchronous generator with transverse flux, in two views. The rotor 1 is therefore also designated a TFM rotor. In this case, FIG. 1a illustrates an axial section through a rotor 1, while FIG. 1b shows a view A according to FIG. 1a. The rotor 1 comprises a support element 2 which is either, as illustrated in FIG. 1a, preferably of disk-like design and substantially has a rotationally symmetrical construction, and a pole structure 3 arranged on the support element 2. The pole structure 3 is arranged in the region of the outer periphery 4 of the support element 2 and extends from a first end face 5 of the support element 2 in the axial direction away from the latter. The pole structure 3 comprises two rows 7 and 8 lying beside each other, separated by an intermediate layer 6 of magnetically and electrically nonconductive material, of permanent magnet arrangements 9 alternately magnetized in the peripheral direction for the row 7 and 10 for the row 8, and collector or soft iron elements 11 lying between them for the row 7 and 12 for the row 8. The collector or soft iron elements 11 and 12 are preferably formed from a plurality of sheet metal elements arranged one behind another, which are preferably kept in shape by means of a potting compound, which simultaneously forms an insulating layer on the collector elements. On the end face, the pole structure 3 is preferably assigned an end ring 13. The pole structure 3 is preferably connected to the support element 2 in a cohesive manner. However, other designs are also conceivable which, in addition to the cohesive connection, permit additional measures for axially and/or radially securing the individual elements of the pole structure with respect to the support element 2. In this case, FIG. 1a illustrates a design which provides for clamping between pole structure 3 and support element 2 in the axial direction via fixing elements 19, which are led through the soft iron elements 11 and 12 of the rows 7 and 8 of permanent magnets 9 and 10, arranged alternately one behind another in the peripheral direction, of collector or soft iron elements 11 and 12, and fixed to the support element 2 or, not illustrated here, are led through the latter and clamped against one another by means of appropriate securing means. The permanent magnet arrangements 9 and 10 in this area are built up at least from two individual magnets 9a, 9b and 10a, 10b in each case. Here, a specific predefined number of fixing elements 19 is used, which are arranged at a specific distance from one another on a diameter in the peripheral direction. In the remaining area, there is the possibility that either each permanent magnet arrangement 9 and 10 comprises a permanent magnet or else two individual magnets 9a, 9b, 10a, 10b arranged one above another in the radial direction. In order to secure the permanent magnets 9 and 10 radially, the collector or soft iron elements adjacent in the peripheral direction for the permanent magnet arrangements 9 in the row 7 and 12 for the permanent magnet arrangements 10 in the row 8 can be provided in the radially outer area with appropriate protrusions, which extend in the peripheral direction partially beyond the extent of the permanent magnet arrangements 9 and 10. Furthermore, security in the radial direction can also be provided by the appropriate configuration of the intermediate layer 6 and of the support element 2 in the area of the first end face 5 and of the end ring 13, so that displacement of the pole structure 3 in the radial direction with respect to the support element 2 is not possible.

According to the invention, at the second end face 14, pointing away from the first end face 5 and therefore from the pole structure 3, at least one partial area 46 is provided which bears a surface region 15 which forms a flange surface 16, within which a rotationally fixed connection to a connecting element 47, in particular a drive element 47 from drive shaft 43, can be implemented. The partial area 46 can therefore also be designated the flange area. The rotationally fixed connection can be made in different ways. However, force-fitting and form-fitting connections will preferably be used. In the surface area 15, therefore, means 47 for guiding means 17 like the screw in FIG. 4 for implementing a rotationally fixed connection between the rotor 1, in particular the support element 2 or 2.4 of the connecting portion of the rotor and a connecting element 47, or partial elements of means 17 and 47 for implementing a rotationally fixed connection between rotor 1 and a connecting element 47 are provided. In the case illustrated, for the purpose of coupling to a connecting element 47 and for the purpose of implementing a rotationally fixed connection, a screw connection at 17 is selected which, in the flange area 46, is characterized by the provision of passage openings 18, which can also bear a thread. The passage openings 18 are in this case arranged in the peripheral direction on the support element 2 in the area of the flange area 46 at a specific distance from one another, preferably a uniform distance in the peripheral direction. The rotor 1 is therefore free of a rotor shaft, on which the support element 2 is mounted in the designs disclosed by the prior art, and is therefore also free of a mounting.

FIG. 1b illustrates the design of the support element 2 as a carrier disk 45, by using a detail from a view A according to FIG. 1a of a rotor 1. This means that the support element 2, viewed in cross-section, is characterized by a solid profile.

Figure 2:
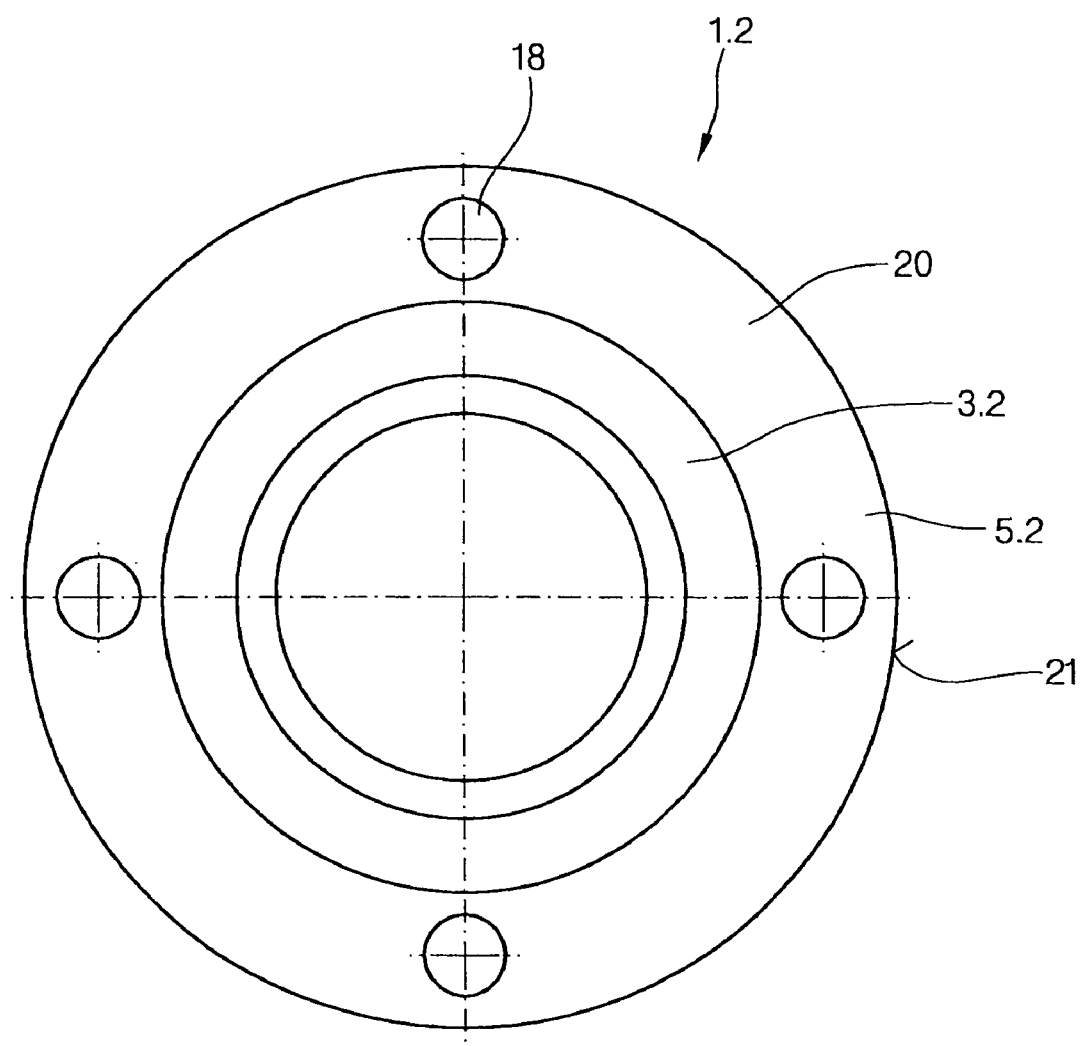
FIG. 2 illustrates, by using a view according to FIG. 1b of a rotor, a further possibility for configuring a support element in the form of a carrier ring.

FIG. 2 uses a view according to FIG. 1b of a rotor 1.2 to illustrate a further possible way of configuring a support element 2.2. Here, the support element is designed as a carrier ring 20 instead of as a disk. In this case, the carrier ring 20 bears the pole structure 3.2 in the area of its outer periphery 21 on its first end face 5.2 and, not illustrated here, in its second end face 14.2 pointing away from the pole structure, forms a flange surface 16.2 for applying to a connecting element 47 and, at the same time, for coupling or guiding means for implementing a rotationally fixed connection to a connecting element.

Figure 3:
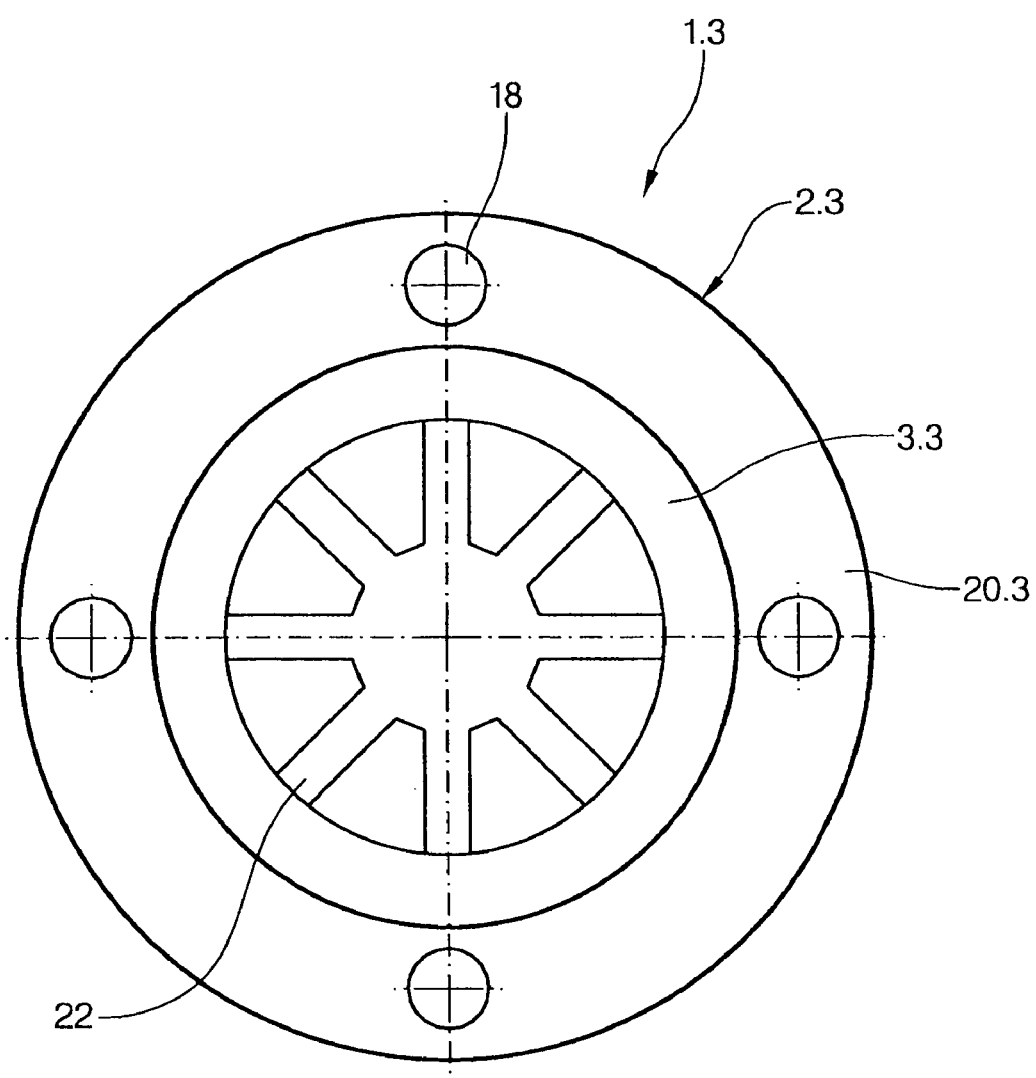
FIG. 3 illustrates a configuration of the support element as a carrier ring with reinforcement by means of intermediate struts.

FIG. 3 illustrates a theoretically further possibility for configuring the support element 2.3 in a view of the pole structure 3.3 of the rotor 1.3. This is characterized by the configuration as a carrier ring 20.3, but is stiffened by appropriate intermediate struts 22.

Figure 4:
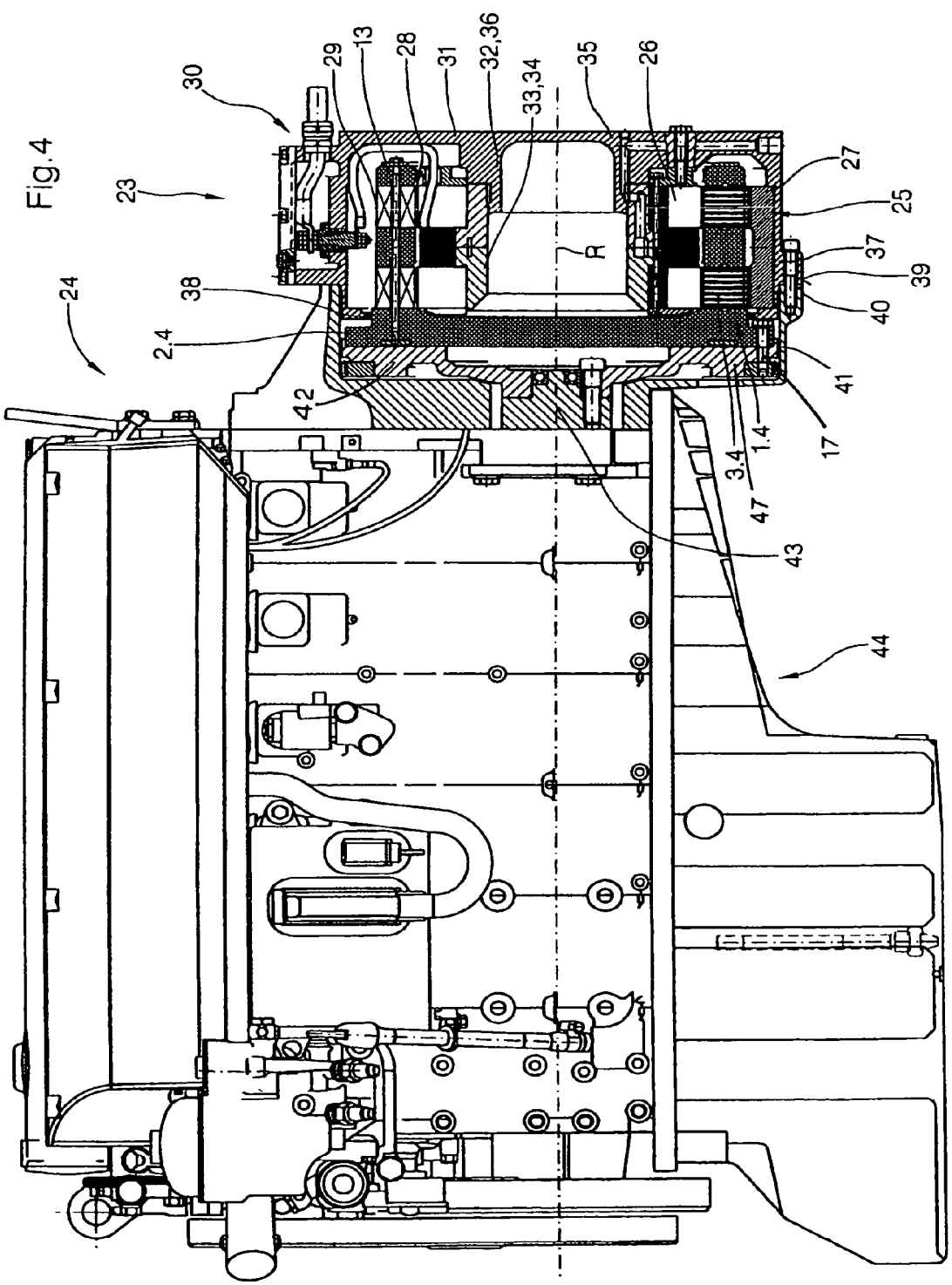
FIG. 4 illustrates an arrangement of an electric machine configured in accordance with the invention, in particular a synchronous machine with transverse flux in a drive unit.

FIG. 4 illustrates an electric machine configured in accordance with the invention, in particular a synchronous machine with transverse flux 23, in a drive system, in particular a drive unit 24, in particular in a particularly advantageous design as a synchronous generator 23 with transverse flux for converting mechanical energy into electrical energy. The synchronous machine 23, in particular the synchronous generator 23 with transverse flux, comprises a rotor 1.4 which, for example, can be designed in accordance with one of FIGS. 1 to 3, other possibilities with respect to the connection between support element 2.4 and pole structure 3.4 also being conceivable. The synchronous generator 23 with transverse flux comprises, in addition to the rotor 1.4, a stator structural unit 25 which comprises at least one inner stator or an outer stator. In the case illustrated, the stator structural unit 25 comprises an inner stator 26 and an outer stator 27 which, in the installed position, in each case forms with the pole structure a radially inner interspace 28 and a radially outer interspace 29, which are also designated an air gap. The stator structural unit 25 is in this case supported on a casing 30. The casing 30 is designed as a casing bell 31 belonging to the synchronous generator 23, extending over the axial extent of the rotor 1.4 from pole structure 3.4 as far as the support element 2.4. The casing 30, in particular the casing bell 31, can in this case be designed in one piece, but preferably a multipart design will be selected for assembly reasons. In the case illustrated, the casing bell 31 has, in the area of the axis of rotation R, a protrusion 32 which extends in the pole structure 3.4 in the direction of the support element 2.4. The protrusion 32 is preferably ring-like. However, a design with individual protrusions is also conceivable, which are arranged in the peripheral direction at a specific distance from one another in the installed position of the axis of rotation R. On this, preferably ring-like, protrusion 32 there is supported a further ring-like element 33, on which the inner stator 26 is mounted. The ring-like element 33 in this case forms a casing part element 34, and the protrusion 32 with the lateral limiting wall 35 forms a further casing part element 36. A further casing part element 37 is provided, which bears the outer stator 27. The casing part element 37 is in this case designed in such a way that it extends in the axial direction substantially as far as into the area of the support element 2.4. The individual casing part elements 34, 36 and 37 form the housing bell 31. The casing 30 is preferably sealed off with respect to the support element 2.4 by means of a non-contact seal 38. The bearing 30 further bears, in the area of the outer periphery 39, a flange region 40, which is used to hold, guide or fix connecting elements for fixing or coupling to another casing 41, for example that of the flywheel 42. The synchronous machine 23, in particular the synchronous generator, is in this case designed as a single-phase synchronous generator with transverse flux and does not have its own mounting, or its own shaft. The mounting of the stator structural unit 25 is provided via the casing 30, in particular the casing bell 31, on the casing of the connecting element, which is designated 41 here, and is formed by the casing of a flywheel 42, while the rotationally fixed connection between the rotor 1.4 and the connecting element is made directly on the support element 2.4. In the case illustrated, the support element 2.4 is rotationally fixedly connected directly to a flywheel 42, which functions as an energy storage device. The flywheel is in turn rotationally fixedly coupled to an output shaft 43 of a drive engine 44. The synchronous generator 23 with transverse flux is therefore coupled directly and torsionally rigidly to a primary energy producer. An additional spring/damping system for avoiding oscillations is not necessary. This leads to a particularly simple design with a small axial length.

The application illustrated in FIG. 4 of the arrangement of a synchronous generator 23 with transverse flux represents a preferred exemplary embodiment. The synchronous generator 23 configured according to the invention can, however, be arranged generally on all energy-producing equipment, including in the region of a secondary output, and can therefore be used for obtaining electrical energy from mechanical energy.

The invention claimed is:

1. A rotor for a synchronous machine, comprising:
   a support element constructed and configured to be mounted for rotation directly on a rotating output element of a driving machine which provides the sole support for the support element, and includes;
   radially extending first and second faces, and
   a connecting portion formed at a peripheral area of the second face of the support element, the connecting portion being constructed and configured to connect the support element to the rotating output element in a torsionally rigid manner with the connecting portion of the support element in direct contact with the rotating output element of the drive machine; and
   a pole structure arranged on the first face of the support element, wherein the pole structure includes:
   first and second rows of magnet arrangements and an intermediate layer of electrically and magnetically nonconductive material arranged between the first and second rows of magnet arrangements, each magnet arrangement including a plurality of alternately magnetized permanent magnets arranged around an outer periphery of the pole element and a plurality of soft iron elements respectively arranged between the alternately magnetized permanent magnets.

2. The rotor of claim 1, wherein the support element is a carrier disk.

3. The rotor of claim 1, wherein the support element is a disk-shaped carrier ring.

4. The rotor of claim 1, wherein the connecting portion of the support element includes at least one opening configured to receive a connector for rotationally fixing the rotor to the connecting element of the drive machine.

5. The rotor of claim 4, wherein the connector includes a screw.

6. The rotor of claim 4, wherein the support element includes a plurality of openings arranged around the outer periphery thereof at a fixed radial distance, and adjacent openings are circumferentially spaced by a spacing distance.

7. The rotor of claim 1, wherein the pole structure is cohesively coupled to the first end face of the support element.

8. The rotor of claim 1, wherein the pole structure is clamped to the first end face of the support element.

9. The rotor of claim 1, wherein the pole structure further includes an end ring element arranged adjacent to the first and second rows of magnet arrangements.

10. A synchronous machine, comprising:
    a casing;
    a stator structural unit supported by the casing; and
    a rotor as claimed in claim 1 operatively coupled to the stator structural unit and positioned to define at least one intermediate gap between the rotor and the stator structural unit.

11. The synchronous machine of claim 10, wherein the casing is formed as a single integral piece.

12. The synchronous machine of claim 10, wherein the casing is formed from a plurality of separate pieces.

13. The synchronous machine of claim 10, wherein the synchronous machine is a synchronous generator.

14. The synchronous machine of claim 10, wherein the synchronous machine has transverse flux.

15. A drive unit, comprising:
    a drive element having an output shaft; and
    a synchronous machine including:
      a casing;
      a stator structural unit supported by the casing; and
      a rotor as claimed in claim 1 operatively coupled to the stator structural unit and positioned to define at least one intermediate gap between the rotor and the stator structural unit.

16. The drive unit of claim 15, wherein the synchronous machine is a synchronous generator.

17. The drive unit of claim 15, wherein the synchronous machine has transverse flux.

18. A drive unit, comprising:
    a drive element having an output shaft; and
    a synchronous machine including:
      a casing;
      a stator structural unit supported by the casing; and
      a rotor as claimed in claim 1 operatively coupled to the stator structural unit and positioned to define at least one intermediate gap between the rotor and the stator structural unit;
    wherein the drive element includes a drive engine, a fly-wheel coupled to the drive engine, and a casing for the drive engine and the a fly-wheel, the connecting portion of the support element forming a flange mounted to the flywheel, the casing of the synchronous machine being coupled to the casing of the drive element.

19. A rotor for a synchronous machine, comprising:
a connecting element for a drive machine; a support element having an outer periphery, first and second end faces, and a connecting portion structured to permit the second face of the support element to be rotationally fixed to and supported by the connecting element of a drive machine in a torsionally rigid manner; and
a pole element arranged on the first end face of the support element, the pole element including first and second rows of magnet arrangements and an intermediate layer of electrically and magnetically nonconductive material arranged between the first and second rows of magnet arrangements, each magnet arrangement including a plurality of alternately magnetized permanent magnets arranged around an outer periphery of the pole element and a plurality of soft iron elements respectively arranged between the alternately magnetized permanent magnets, and
the support element is a disk-shaped carrier ring including intermediate struts for support.

20. A rotor for a synchronous machine, comprising:
a connecting element for a drive machine; a support element having an outer periphery, first and second end faces, and a connecting portion structured to permit the second face of the support element to be rotationally fixed to and supported by the connecting element of a drive machine in a torsionally rigid manner; and
a pole element arranged on the first end face of the support element, the pole element including first and second rows of magnet arrangements and an intermediate layer of electrically and magnetically nonconductive material arranged between the first and second rows of magnet arrangements, each magnet arrangement including a plurality of alternately magnetized permanent magnets arranged around an outer periphery of the pole element and a plurality of soft iron elements respectively arranged between the alternately magnetized permanent magnets, and
the connecting portion of the support element includes protrusions configured to couple with recesses of the connecting element of the drive machine to permit the rotor to be rotationally fixed to a connecting element of the drive machine in a form-fitting manner.

21. A rotor for a synchronous machine, comprising:
a connecting element for a drive machine; a support element having an outer periphery, first and second end faces, and a connecting portion structured to permit the second face of the support element to be rotationally fixed to and supported by the connecting element of a drive machine in a torsionally rigid manner; and
a pole element arranged on the first end face of the support element, the pole element including first and second rows of magnet arrangements and an intermediate layer of electrically and magnetically nonconductive material arranged between the first and second rows of magnet arrangements, each magnet arrangement including a plurality of alternately magnetized permanent magnets arranged around an outer periphery of the pole element and a plurality of soft iron elements respectively arranged between the alternately magnetized permanent magnets, and
the connecting portion of the support element includes recesses configured to couple with protrusions of the connecting element of the drive machine to permit the rotor to be rotationally fixed to a connecting element of the drive machine in a form-fitting manner.

22. A synchronous machine comprising:
a casing;
a stator structural unit supported by the casing; and
a rotor operatively coupled to the stator structural unit and positioned to define at least one intermediate gap between the rotor and the stator structural unit, the rotor comprising:
a connecting element for a drive machine;
a support element having an outer periphery, first and second end faces, and a connecting portion structured to permit the second face of the support element to be rotationally fixed to and supported only by the connecting element of the drive machine in a torsionally rigid manner; and
a pole element arranged on the first end face of the support element, the pole element including first and second rows of magnet arrangements and an intermediate layer of electrically and magnetically nonconductive material arranged between the first and second rows of magnet arrangements, each magnet arrangement including a plurality of alternately magnetized permanent magnets arranged around an outer periphery of the pole element and a plurality of soft iron elements respectively arranged between the alternately magnetized permanent magnets;
the casing is formed from a plurality of separate pieces
the casing includes first and second casing portions, the first casing portion forming a lateral limit of the synchronous machine, the second casing portion being coupled to the first casing portion and extending axially into an area of the support element.

23. The synchronous machine of claim 22, wherein the stator structural unit includes an outer stator positioned such that a gap is defined between the outer stator and the outer periphery of the support element.

24. The synchronous machine of claim 22, wherein the casing includes a third casing portion extending into the pole element and the stator structural unit includes an inner stator supported on the third casing portion.

25. A synchronous machine, comprising:
a casing;
a stator structural unit supported by the casing; and
a rotor operatively coupled to the stator structural unit and positioned to define at least one intermediate gap between the rotor and the stator structural unit, the rotor comprising:
a connecting element for a drive machine;
a support element having an outer periphery, first and second end faces, and a connecting portion structured to permit the second face of the support element to be rotationally fixed to and supported only by the connecting element of the drive machine in a torsionally rigid manner; and
a pole element arranged on the first end face of the support element, the pole element including first and second rows of magnet arrangements and an intermediate layer of electrically and magnetically nonconductive material arranged between the first and second rows of magnet arrangements, each magnet arrangement including a plurality of alternately magnetized permanent magnets arranged around an outer periphery of the pole element and a plurality of soft iron elements respectively arranged between the alternately magnetized permanent magnets; and
a non-contact sealing element provided between the casing and the support element.

* * * * *